United States Patent [19]

Shimada et al.

[11] 4,190,137
[45] Feb. 26, 1980

[54] APPARATUS FOR DEICING OF TROLLEY WIRES

[75] Inventors: Akira Shimada, Ibaraki; Kouichi Watanabe, Kobe; Katsuji Nakajima, Kashihara, all of Japan

[73] Assignees: Dainichi-Nippon Cables, Ltd.; Kawasaki Jukogyo Kabushiki Kaisha, both of Kobe, Japan

[21] Appl. No.: 918,168

[22] Filed: Jun. 22, 1978

[51] Int. Cl.² .............................................. B60M 1/34
[52] U.S. Cl. ...................................................... 191/27
[58] Field of Search ...................... 191/22 R, 27, 33 R, 191/62

[56] References Cited

U.S. PATENT DOCUMENTS

| 2,870,311 | 1/1959 | Greenfield | 191/27 X |
| 3,316,362 | 4/1967 | Mayo | 191/27 |

Primary Examiner—Richard A. Schacher
Attorney, Agent, or Firm—W. G. Fasse; D. F. Gould

[57] ABSTRACT

In a power transmission system comprising at least two trolley wires for supplying an alternating current power to an electric vehicle, and at least two feeder lines coupled to the trolley wires at feeding points of the corresponding trolley wires spaced apart a given interval for feeding a voltage to the trolley wires, with a closed loop formed between a portion of the trolley wires and a portion of the feeder lines through two adjacent feeding points, a throughtype current transformer is provided for each feeder line such that the feeder line extends through the transformer and the primary winding of the transformer is connected to receive an alternating current voltage between the above described at least two trolley wires, whereby a secondary alternating current induced in the feeder lines serving as a secondary conductor of the transformer flows through the above described closed loop, which causes a Joule heat along the trolley wires, thereby to deicing of the trolley wires. Preferably, an alternating voltage between the above described at least two trolley wires is selectively applied to the primary winding of the transformer, such that a supply of the alternating current voltage to the primary winding is controlled manually or automatically responsive to meteorological conditions. Such an automatic control of a supply to the primary winding of the transformer may be selectively effected, in association with the temperature of the trolley wires being lower than a preset temperature, a predetermined meteorological condition being met by an ambient temperature, water, snow and the like, a current normally flowing through the trolley wires being less than a predetermined value, and the like, singly or in combination.

10 Claims, 5 Drawing Figures

PRIOR ART

APPARATUS FOR DEICING OF TROLLEY WIRES

BACKGROUND OF THE INVENTION

1. Field of the Invention;

The present invention relates to an apparatus for deicing of trolley wires. More specifically, the present invention relates to an apparatus for deicing trolley wires in a power transmission system comprising at least two trolley wires for supplying an alternating current power to an electric vehicle.

2. Description of the Prior Art;

Water, snow etc, if any, on trolley wires installed in a power transmission system for supplying an alternating current power to an electric vehicle is frozen to form a ice layer on the trolley wires when the ambient temperature or the temperature of trolley wire becomes lower than the freezing point. The ice layer prevents an electrical contact with a pantograph of an electric vehicle. As a result, a supply of an electric power from the trolley wires to an electric vehicle is disturbed and a pantograph is broken. For this reason, the operation of electric vehicles is often obstructed.

A prior art system for deicing of trolley wires which is of interest to the present invention is disclosed in Japanese Published unexamined utility model application No. 131601/1974, laid open Nov. 12, 1974 for public inspection. FIG. 1 shows a schematic diagram of the prior art system for deicing of trolley wires as disclosed in the above referenced Japanese Utility Model Laying Open Gazette. Referring to FIG. 1, a trolley wire 11 for supplying an electric power to an electric car is suspended from a stringing wire 13 by means of a plurality of electrically insulating hangers 12 and electrically conductive hanger 12'. The plurality of hangers 12 are provided to hang the trolley wire 11 from the stringing wire 13, with the trolley wire 11 electrically insulated from the stringing wire 13, while the hangers 12' are set in the vicinity of the feeding points 14 and 14' so as to electrically connect the corresponding points at the trolley wire 11 to the feeding points 14 and 14'. The feeding points 14 and 14' are connected to a feeder wire cable 15 at predetermined intervals of distance for the purpose of feeding a voltage to the trolley wire 11, thereby to compensate for a voltage drop along the trolley wire 11. As a result, a closed loop is formed by means of a portion of the feeder line 15 and the trolley wire 11, coupled to each other at the feeding points 14 and 14' through the hangers 12'. A rail installed beneath and along the trolley wire 11 forms a return circuit of a current flowing from the trolley wire 11 through a pantograph of an electric car and wheels thereof to the rail 16. A primary winding 171 of a transformer 17 is connected between the feeder line 15 and the rail 16. A secondary winding 172 of the transformer 17 is provided to transform the voltage applied to the primary winding 171 to a lower voltage and is connected to a full wave rectifier 18. The full wave rectifier 18 comprises a bridge circuit of diodes, connected in a well known fashion, and the direct current output is applied to the above described closed loop formed by the feeder line 15 and the trolley wire 11. The direct current output terminals of the full wave rectifier 18 may be shunted with an alternating current bypassing diode 19. With such a circuit configuration, a direct current is caused to flow through the above described closed loop comprising the feeder line 15 and the trolley wire 11 and the said direct current is superposed on the alternating current flowing through the trolley wire 11. As a result, the current flowing through the trolley wire 11 is increased and a Joule heat is produced along the trolley wire 11, thereby to deicing of the trolley wire 11.

However, the above described prior art system requires the transformer 17 and the full wave rectifier 18 for the purpose of applying a direct current to the trolley wire 11 to deicing of the trolley wire, with the result that the circuit configuration becomes complicated and expensive. In such a power transmission system where a single trolley wire and the rails are utilized for supplying an electric power to an electric vehicle, a very high voltage power of such as several thousand volt to several ten thousands volt should be transmitted and this necessitates transformation of the said very high voltage to an appropriate voltage suited for rectification into a direct current voltage to be supplied to the trolley wire for the purpose of deicing of the trolley wire, with the result that the transformer 17 should be extremely large sized and becomes expensive. In addition, in order to apply the output of the full rectifier to the feeder line and the trolley wire, some connections for such direct current circuit need be separately provided, which makes installation complicated and expensive. Furthermore, as the output direct current from the rectifier is divided into two parts at the connection point of feeder line, only one part of the divided current is effective to increase a Joule heat in the trolley wire 11. As a result, deicing of the trolley wires need much electric power, resulting in lower efficiency.

Another example of interest to the present invention for an apparatus for deicing of trolley wires is seen in Japanese Published examined patent application No. 42805/1976, published Nov. 18, 1976 for opposition. More specifically, the referenced Patent Publication Gazette discloses that both a trolley wire for an up line and a trolley wire for a down line of a double track are connected at the terminations to form a closed loop and a separate power source for supplying a power for deicing is provided in a power source for supplying an electric power to both trolley wires, such that an alternating current is applied from the substation to the closed loop formed by the trolley wires of the up and down lines, whereby an additional electric power is applied to the trolley wires and a icing of the trolley wires is prevented or unfreezed. However, the above described deicing apparatus requires a double track including an up and down lines. For this reason, the apparatus disclosed in the referenced Japanese Patent Publication cannot be applied to a single track. In addition, the closed loop formed by the up and down lines becomes so large as to cover a distance between two adjacent substations coupled to the double track. As a result, a deicing operation should be effected in such a large closed loop and a localized deicing operation cannot be effected such that a freeze of the trolley wires is prevented only in a relatively short span of the trolley wires where prevention of a icing is required by virture of meteorological conditions in such a local area. For this reason, the system disclosed in the latter referenced Patent Publication involves a problem of an increased power loss.

SUMMARY OF THE INVENTION

Briefly described, in a power transmission system comprising at least two trolley wires for supplying an alternating current power to an electric vehicle and at least two feeder lines coupled to the trolley wires at feeding points of the corresponding trolley wires spaced apart a given interval for feeding a voltage to the trolley wires, with a closed loop formed between a portion of the trolley wires and a portion of the feeder lines through two adjacent feeding points, a through-type current transformer is provided for each feeder line such that the feeder line extends through the transformer and the primary winding of the transformer is connected to receive an alternating current voltage between the above described at least two trolley wires, whereby a secondary alternating current induced in the feeder lines flows through the above described closed loop, which causes a Joule heat along the trolley wires, thereby to deice of the trolley wires.

Preferably an alternating voltage between the above described at least two trolley wires is selectively applied to the primary winding of the through-type current transformer, such that a supply of the alternating current voltage to the primary winding of the through-type current transformer is controlled manually or automatically responsive to ambient meteorological conditions. Such an automatic control of a supply of the alternating current voltage to the primary winding of the through-type transformer is selectively effected, in association with various conditions, singly or in combination, such as the temperature of the trolley wires being lower than a predetermined temperature, a predetermined meteorological condition being met by an ambient temperature, water, snow and the like, a current normally flowing through the trolley wires being less than a predetermined value, and the like.

Therefore, a principal object of the present invention is to provide an apparatus for preventing a icing of trolley wires, which is simple in structure, easy of maintenance and inexpensive in cost, and of higher efficiency.

Another object of the present invention is to provide an apparatus for deicing of trolley wires, wherein a icing can be prevented selectively in a relatively short span of trolley wires, where deicing of the trolley wires is most required in the light of the meteorological conditions in such a local area.

A further object of the present invention is to provide an apparatus for deicing of trolley wires, wherein a power consumption required for deicing of the trolley wires is reduced and thus a icing of the trolley wires can be prevented with a less power loss and with a higher efficiency.

These objects and other objects, features, aspects and advantages of the present invention will become more apparent from the following detailed description of the present invention when taken in conjunction with the companying drawings.

DESCRIPTION OF THE PREFERRED EMBODIMENTS

Figure 1:
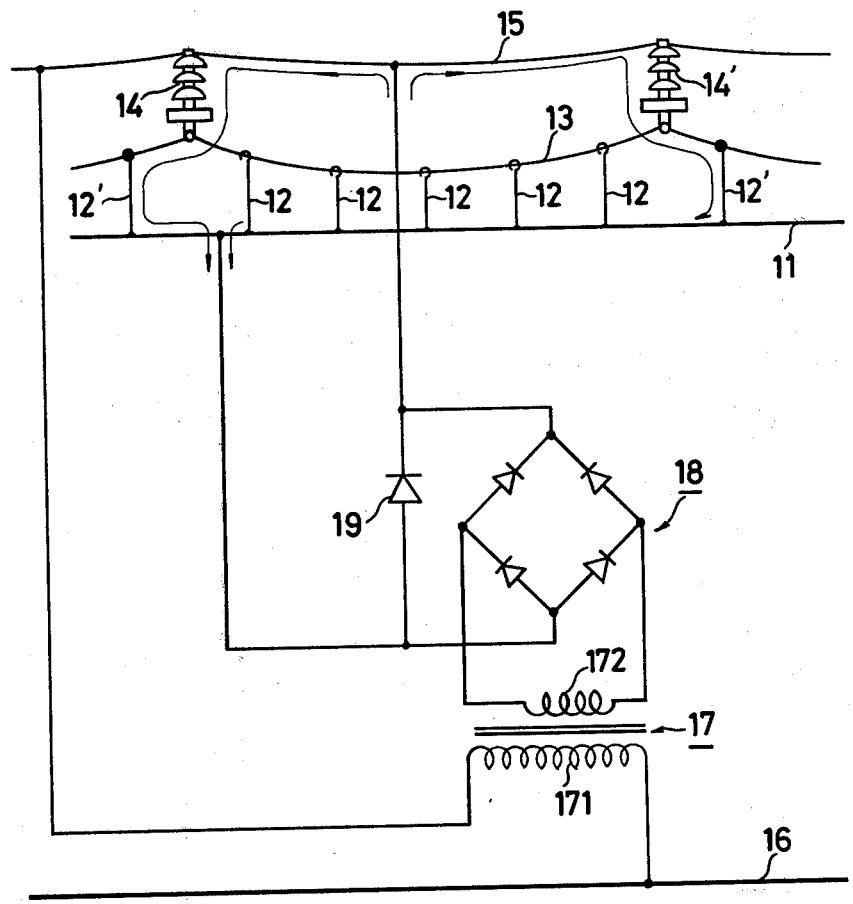
FIG. 1 shows a schematic diagram of a prior art apparatus for deicing of trolley wires.
Figure 2:
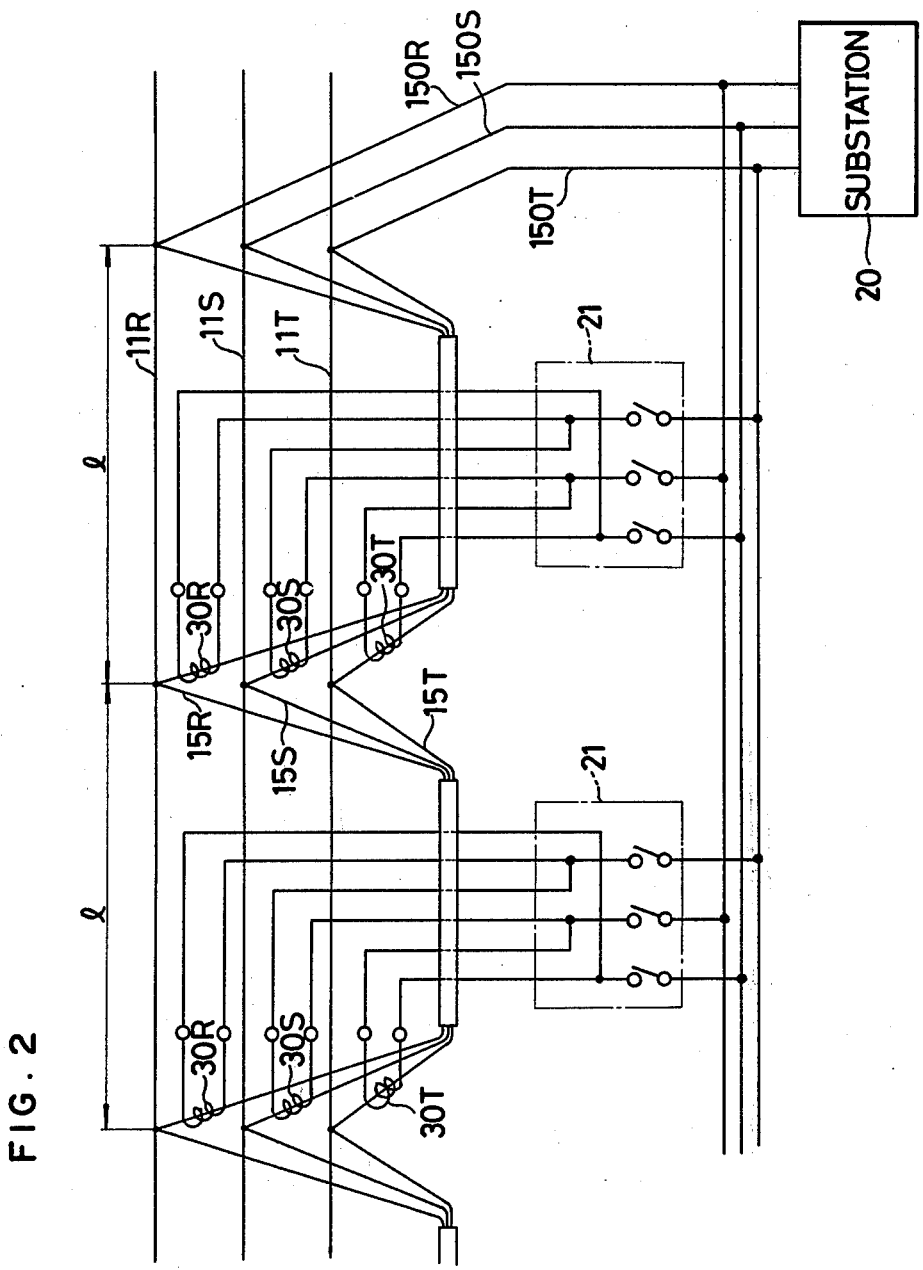
FIG. 2 is a block diagram showing the principle of the present invention.

FIG. 2 is a block diagram showing the principle of the present invention. As described previously, the present invention is characterized by employment of a through-type current transformer. Therefore, it would be appropriate to describe the through-type current transformer, before the explanation of the principle of the present invention with FIG. 2.

Figure 3:
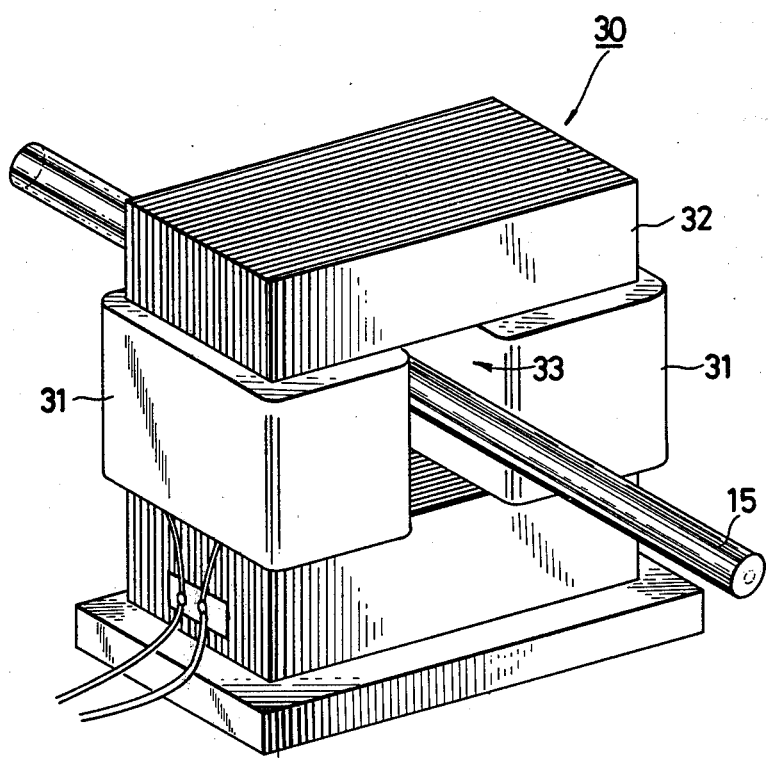
FIG. 3 is a perspective view of a through-type current transformer for use in the present invention.

FIG. 3 is a perspective view of a through-type current transformer to be employed in the present invention. Referring to FIG. 3, the through-type current transformer 30 comprises a primary winding 31 wound around the portions of an O letter shaped core 32 having a through aperture 33. According to the present invention, the through-type current transformer 30 is utilized such a manner that a feeder line 15 extends through the through aperture 33 of the core 32 of the transformer. Therefore, when an alternating current voltage is applied to the primary winding 31, an alternating current flux is induced in the core 32 and accordingly an alternating current is induced by the alternating current flux to flow through the feeder line 15.

With simultaneous reference to FIGS. 2 and 3, the principle of the present invention will be described in the following. With particular reference to FIG. 2, the embodiment is shown comprising three trolley wires 11R, 11S and 11T which are installed along a path for travel of electric vehicles, such as electric cars, to supply a three-phase alternating current power to the electric vehicles. The three trolly wires 11R, 11S and 11T are electrically connected to three feeder lines 15R, 15S and 15T installed along the above described three trolley wires 11R, 11S and 11T, respectively, at predetermined intervals of distance l for the purpose of supplying a three-phase alternating current power from the feeder lines 15R, 15S and 15T to the corresponding trolley wires 11R, 11S and 11T at the above described intervals l. The three feeder lines 15R, 15S and 15T are connected at the ends thereof through three supply lines 150R, 150S and 150T, respectively, to a substation 20. Thus, it would be appreciated that for each span of the above described intervals l a closed loop is formed for each phase by the corresponding portion of the respective trolley wire and the corresponding portion of the respective feeder line as coupled to each other at the adjacent two feeding points. Thus, for each span of the above described intervals l, three closed loops are formed, the closed loop for the phase R including the corresponding portions of the trolley wire 11R and the feeder line 15R, the closed loop for the phase S including the corresponding portions of the trolley wire 11S and the feeder line 15S, and the closed loop for the phase T including the corresponding portions of the trolley wire 11T and the feeder line 15T.

At each span of the above described intervals l, through-type current transformers 30R, 30S and 30T structured as shown in FIG. 3 are set such a manner that the feeder lines 15R, 15S and 15T extend through the through apertures 33 of the transformers 30R, 30S and 30T, respectively. It is pointed out that in FIG. 2 the through-type current transformers are identified by the reference numeral 30 as affixed with postscripts R, S and T to represent the corresponding phases R, S and T, although in FIG. 3 such postscripts were not employed. As best seen in FIG. 2, the primary windings 31 of the through-type current transformers 30R, 30S and 30T are connected to two supply lines among three supply lines 150R, 150S and 150T or alternatively connected to two trolley wires among the three trolley wires 11R, 11S and 11T. So as to receive a single phase alternating current power. Preferably, a switch means 21 is set for each span to selectively supply the above described three sets of single phase alternating current powers to the primary windings of the through-type current transformers 30R, 30S and 30T from the supply lines 150R, 150S and 150T or from the trolley wires 11R, 11S and 11T. The switch means 21 may be a manual switch selectively operable by an operator. Alternatively, the switch means 21 may be an automatic circuit breaker automatically operable according to a predetermined condition such as a meteorological condition, such as an ambient temperature, water, snow and the like, and/or a physical condition of the trolley wires, such as the temperature, the current and the like of the trolley wires.

In operation, when an ambient meteorological condition becomes worse, i.e. an ambient temperature becomes lower than the ice point when the water and/or snow exist, so that trolley wires 11R, 11S and 11T are placed in a condition where a freeze is likely to occur, the switch means 21 is closed manually or automatically according to detection of such meteorological condition, whereby an alternating current voltage is applied to each of the primary windings of the through-type current transformers 30R, 30S and 30T. Accordingly, an alternating current flux is induced in each of the cores 32 of the through-type current transformers 30R, 30S and 30T and thus an alternating current is induced in each of the feeder lines 15R, 15S and 15T extending through the through apertures 33 of the transformers. The alternating current thus induced in each of the feeder lines 15R, 15S and 15T by virtue of the alternating current flux of the respective through-type current transformers 30R, 30S, and 30T is caused to flow through the corresponding closed loop. As a result, in each of the trolley wires 11R, 11S and 11T, there flows a sum of a load current to be caused to flow through each of the feeder lines 15R, 15S and 15T in order to operate the electric vehicles and the above described induced current caused to flow through each of the above described closed loop.

Because of superposition of the above induced current and load current usually flowing through the trolley wires during the operation of the electric vehicles, a Joule heat is generated in each of the trolley wires 11R, 11S and 11T which serves to deice the trolley wires. When no electric vehicles is operated, then no load current flows through the trolley wires and accordingly only the above described induced current is caused to flow through each of the trolley wires.

It should be pointed out that the direction of flow of the load current in each of the trolley wires 11R, 11S and 11T by virtue of the operation of the electric vehicles and the direction of flow of the above described induced current in each of the trolley wires 11R, 11S and 11T induced by means of the corresponding through-type current transformers 30R, 30S and 30T are selected to be the same and thus the direction of flow of the above described induced current in each of the feeder lines 15R, 15S and 15T is opposite to the direction of flow of the current normally flowing therethrough, with the result that a much more Joule heat is produced in each of the trolley wires as compared with that in each of the feeder lines.

In a preferred embodiment of the present invention, the switch means 21 is adapted to be on/off controlled automatically according to an ambient meteorological condition, the condition of the trolley wires per se, and the like. Such embodiment will be described in the following.

Figure 4:
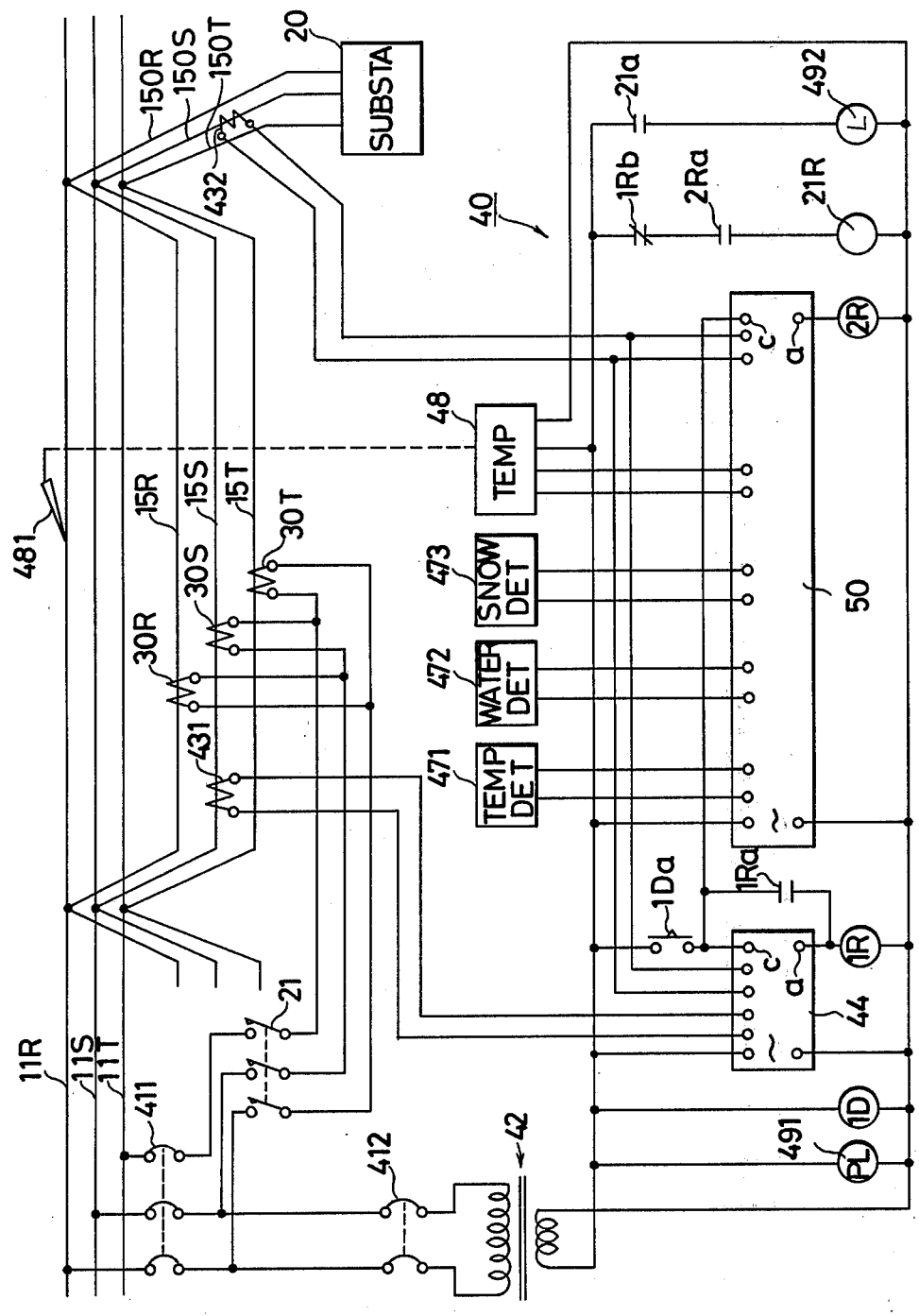
FIG. 4 is a block diagram of a preferred embodiment of the present invention.
Figure 5:
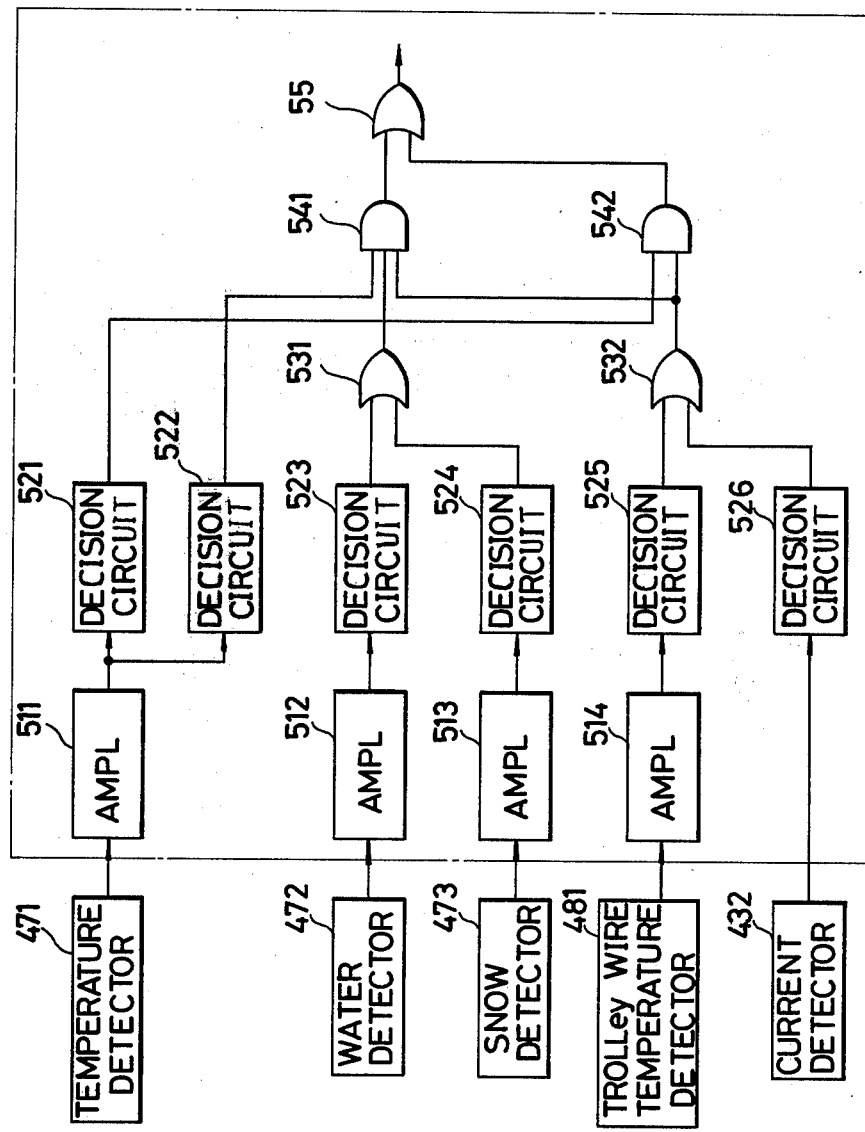
FIG. 5 is a block diagram showing in more detail a decision circuit in the FIG. 4 embodiment.

FIG. 4 is a block diagram of a preferred embodiment of the present invention and FIG. 5 is a block diagram of a decision circuit 50 employed in the FIG. 4, wherein decision is made automatically as to whether a icing of the trolley wires should be prevented in response to an ambient meteorological condition, such as an ambient temperature, water, snow and the like, and a trolley wire condition, such as a trolley wire temperature, trolley wire current and the like.

The above described trolley wires 11R, 11S and 11T for supplying a three-phase alternating current power are connected to one side terminals of an electromagnetic switch serving as the above described switch means 21 through a molded case circuit breaker 411. The other side terminals of the electromagnetic switch 21 are connected to the primary windings of the through-type current transformers 30R, 30S and 30T, such that a single phase power is taken from two of the three other side terminals in different combinations. A current transformer 431 is coupled to any one line, such as 15S in the embodiment shown, among the feeder lines 15R, 15S and 15T, for detecting an overcurrent flowing in the feeder lines. Among the power supply lines 150R, 150S and 150T, another current transformer 432 is coupled to the same phase 150S as that of the feeder line 15S wherein the current transformer 431 is coupled, for detecting an overcurrent flowing through the supply lines. The current transformer 432 may also be utilized to detect a current to be supplied from the substation 20 to the transmission system being less than a predetermined value such as in case where the number of operations of the electric vehicles is reduced in a night time, for example, which is taken into consideration in determining whether a freeze of the trolley wires should be prevented.

A voltage between the trolley wires 11R and 11S obtainable through the molded case circuit breaker 411 is applied through another molded case circuit breaker 412 to a primary winding of a transformer 42. The secondary winding of the transformer 42 is connected to a control unit 40 for the purpose of energization thereof. The control unit 40 comprises a parallel connection coupled to the secondary winding of the transformer 42 including a delay relay 1D for a delay operation responsive to initiation of energization, an overcurrent detecting circuit 44 responsive to the overcurrent detected output of the current transformer 431 and 432 for energizing a relay 1R, decision circuit 50 responsive to an ambient temperature detector 471, a water detector 472, a snow detector 473, a trolley wire temperature detector 48 and the current transformer 432 for determining a condition of necessity for deicing of the trolley wires, a relay 21R for closing the electromagnetic switch 21, a pilot lamp 491 for displaying a state of supply of the power, and a lamp 492 connected in series with a normally open auxiliary contact 21a of the electromagnetic switch 21 for indicating the closed state of the electromagnetic switch 21.

In a normal state of operation where the meteorological condition is better, when the molded case circuit breakers 411 and 412 are closed, the secondary voltage of the transformer 42 is applied to the control unit 40 and thus the pilot lamp 491 is lit to indicate a supply state of the power and with a delay of a predetermined period of time after initiation of energization the contact 1Da of the delay relay 1D is closed, whereby a voltage is applied to the overcurrent detecting circuit 44, and the decision circuit 50 for energization thereof. Since various circuits such as 44 and 50 are supplied with an energization power after the contact 1Da of the delay relay 1D is closed, any information which is liable to occur until a steady state is reached after initiation of energization can be prevented. The overcurrent detecting circuit 44 is structured such that unless the current in the feeder line 15S as detected by the current detector 431 and 432 exceeds a predetermined current value a connection between the terminals a and c is opened so that the relay 1R may not be energized. Therefore, the normally closed contact of the relay 1Rb is remains closed. However, since the relay 2R is not energized in such a situation, the contact 2Ra of the relay 2R is opened. Accordingly, the relay 21R is not energized, whereby the electromagnetic switch 21 is kept opened and the through-type current transformers 30R, 30S and 30T are not supplied with a power.

Now description will be made of how an iced trolley wires is deiced in response to detection of an ambient meteorological condition. As the above described temperature detector 471, a transistor coupled to be variable of the characteristic as a function of an ambient temperature, a thermocouple or the like may be used. The above described water detector 472 may be structured such that it's impedance is varied as a function of presence or absence of water and thus the output voltage thereof is decreased responsive to presence of the water. The above described snow detector 473 may comprise a heater for heating a portion of snow for melting the same and a water detector similar to the water detector 472 for detecting the presence of the water produced as a result of melting of the snow for providing a decreased output voltage responsive to the snow. The trolley wire temperature detector 481 may comprise a thermocouple provided associated with one of the trolley wires, the output voltage of which is variable as a function of the temperature of the trolley wire. The current detector 432 may comprise a current transformer.

The detected outputs of the temperature detector 471, the water detector 472, the snow detector 473, the trolley wire temperature detector 481 and the current detector 432 are applied to the amplifiers 511, 512, 513, 514 and a decision circuit 526, respectively, in the decision circuit 50. The output voltage of ambient temperature as amplified by the amplifier 511 is applied to decision circuits 521 and 522. The decision circuit 522 is structured to level detect the above voltage of ambient temperature at a predetermined level, say a level corresponding to the ambient temperature of +2° C., so that the high level output signal is obtained when the ambient temperature is lower than the above described temperature of +2° C. The output of the decision circuit 522 is applied to an AND gate 541. A decision circuit 523 is connected to the amplifier 512 to receive the output of the amplifier 512 and is structured to determine whether the output voltage of the water detector 472 has become lower than a predetermined voltage due to the presence of the water, thereby to provide the high level output to an OR gate 531. A decision circuit 524 is connected to the amplifier 513 to receive the output of the amplifier 513 and is structured to determine whether the output voltage of the snow detector 473 has become lower than a predetermined voltage due to the presence of snow, thereby to provide the high level output to the OR gate 531. A decision circuit 525 is connected to the amplifier 514 to receive the output of the amplifier 514 and is structured to level detect the voltage of trolley wire temperature at a predetermined level, say the temperature of +2° C., so that the high level output is applied to the OR gate 532, when the trolley wire temperature is lower than the temperature of +2° C. On the other hand, the decision circuit 526 is structured to level detect the trolley wire current at a predetermined level, say the current value of 50A, so that the high level output siganl is obtained when the trolley wire current is smaller than the current of 50A and is applied to the other input of the OR gate 532.

Accordingly, when the ambient temperature is lower than the predetermined temperature of say +2° C. under the presence of water or snow and the trolley wire temperature is lower than the predetermined temperature of say +2° C. or the trolley wire current is smaller than the predetermined value of say 50A, the AND gate 541 is enabled to provide the high level output signal as a command for additional heating of the trolley wires for deicing of the trolley wires.

The decision circuit 521 is structured to level detect the above described voltage of ambient temperature at another given level corresponding to another different predetermined ambient temperature of say −1° C. which is 3° C. lower than the above described predetermined temperature of +2° C., so that the high level output signal is obtained when the ambient temperature becomes lower than the above described another predetermined temperature of −1° C. Accordingly, when the ambient temperature is lower than the above described another predetermined temperature of −1° C. and the trolley wire temperature is lower than the above described predetermined temperature of +2° C. or the trolley wire current is smaller than the above described predetermined current value of 50A, the AND gate 542 is enabled to provide the high level output as a command for additional heating of the trolley wires.

The outputs of these AND gates 541 and 542 are applied through an OR gate 55 to the relay 2R for energization thereof. Therefore, when the high level output is obtained from the OR gate 55, the terminals a and c of the decision circuit 50 is connected and the normally open contact 2Ra of the relay 2R is closed, whereby the relay 21R is energized. Therefore, the electromagnetic switch 21 is closed. Since the normally open contact 21 is closed, an alternating current voltage is applied to each of the primary windings 31 of the through-type current transformers 30R, 30S and 30T, whereby an alternating magnetic flux is induced in each of the magnetic cores 32 of the transformers and accordingly an induced current flows through each of the closed loops comprising the corresponding portions of the feeder lines 15R, 15S and 15T and the trolley wires 11R, 11S and 11T for the span now in discussion. A flow of the above described induced current in each of the trolley wires causes an additional Joule heat, thereby to prevent or deice the trolley wires. At the same time the normally open auxiliary contact 21a of the relay 21R is closed and the lamp 492 is lit to indicate that the trolley wires are being heated.

In the foregoing description, the decision circuit 50 was described as structured to make coordinated decision responsive to detection of the meteorological condition such as an ambient temperature, water, snow and the like and the detection of a trolley wire condition such as the trolley wire temperature, the trolley wire current, and the like to determine whether a command for additional heating by the induced current should be provided. Besides the above decision circuit 50, such a decision circuit may also be used, wherein among the above described conditions, inasmuch as a condition such as meteorological condition, trolley wire condition etc, may be utilized to make separate decision to determine whether a command for additional heating should be provided responsive individually to each detection. In addition to the detectors 471, 472, 473 or in place of the detector 472 in the decision circuit 50, another detector such as a humidity detector, fog detector and the like may also be used. Either of the trolley wire temperature detector 481 and the current detector 432 may be omitted, because there is a certain relationship between the trolley wire temperature and the current of the feeder lines in some conditions.

Now description will be made of the operation in case where an overcurrent flows through the trolley wires. When at least any one of the detectors 471, 472, 473, and 481 is in disorder and thus the temperatures are not detected correctly, in spite of the fact that a command for additional heating has been obtained and the induced current has been caused to flow through the trolley wires as well as the feeder lines of the closed loops by means of the throughtype current transformers, the total of the currents in the current transformers 431 and 432 increases to exceed a predetermined current value of say 600 A. The overcurrent detector 44 is structured such that the terminals a and c is closed to energize the relay coil 1R when the total of the currents in the current transformers 431 and 432 exceeds the above described predetermined value of say 600 A. Accordingly, in such a situation, the normally open contact 1Ra of the relay 1R is closed and the relay 1R is energized to be selfretained, while the normally closed contact 1Rb is opened. Therefore, the relay 21R is deenergized and the electromagnetic switch 21 is opened. Therefore, the alternating current voltage applied to the primary windings of the through-type current transformers 30R, 30S and 30T is interrupted and the induced current by the through-type current transformers is accordingly interrupted, with the result that additional heating of the trolley wires by means of the through-type current transformers is discontinued.

As described in the foregoing, according to the embodiments of the present invention, additional heating of the trolley wires is achieved by an alternating current induced by the through-type current transformers rather than utilizing a transformer and a rectifying circuit for supplying an additional direct current power to the trolley wires. As a result, a large sized transformer and a rectifying circuit of a large capacity can be dispensed with. Thus, according to the present invention, an apparatus for deicing of the trolley wires is provided, which is simple in structure, easy of maintenance and is inexpensive in cost. According to another aspect of the present invention, the through-type current transformers are provided to induce an additional current only in the closed loops formed in a relatively shorter span of the trolley wires by a portion of the trolley wires and a portion of the feeder lines. As a result, only a portion of the trolley wires included in the closed loop can be selectively heated to deice the trolley wires which is likely to occur in a relatively narrow local area. As a result, deicing of the trolley wires can be achieved with less electric power and thus with higher efficiency. According to another aspect of the present invention, the condition for deicing of the trolley wires is determined by an coordinated or individual decision of an ambient meteorological condition, a trolley wire condition and the like and an automatic control is effected responsive to such decision. According to further aspect of the present invention, the present invention can also be employed even in a single track system as well as a double track system including an up and down lines.

Although in the foregoing description, the embodiments were described as employing a power transmission system comprising three trolley wires combined with three feeder lines for supplying a three-phase electric power to electric vehicles, it is pointed out that the present invention can be equally applied to a power transmission system comprising only two trolley wires combined with two feeder lines for supplying a single phase alternating current power to electric vehicles. Thus, it is intended that the present invention also covers such changes and modifications.

Originally, the feeder lines 15R, 15S and 15T are provided to feed at intervals l to the trolley wires 11R, 11S and 11T an alternating current electric power of the respective phases to eliminate a voltage drop along the trolley wires 11R, 11S and 11T because of the load current flowing therethrough. Therefore, the present invention can be advantageously employed in such a power transmission system comprising a plurality of trolley wires for supplying an alternating current power to electric vehicles and the corresponding plurality of feeder lines already installed to be coupled to the trolley wires at feeding points of the corresponding trolley wires spaced apart a given interval for the purpose of only feeding a voltage to the trolley wires, by additionally providing a through-type current transformer for each feeder line such that the feeder line extends through the transformer and connecting the primary winding of the transformer to receive an alternating current voltage between two trolley wires or feeder lines. Thus, according to the present invention, skillful use is made of the feeder lines already installed to be coupled to the trolley wires for the purpose of feeding a voltage to the trolley wires. On the other hand, the present invention can also be advantageously employed in a power transmission system comprising only trolley wires for supplying an alternating current power to electric vehicles, by additionally providing feeder lines to be coupled to the trolley wires at feeding points of the corresponding trolley wires spaced apart a given interval for the purpose of feeding a voltage to the trolley wires and also for the purpose of forming a closed loop between a portion of the trolley wires and a portion of the feeder lines through two adjacent feeding points, and by further providing a through-type current transformer for each feeder line such that the feeder line extends through the transformer and the primary winding of the transformer is connected to receive an alternating current voltage between at least two trolley wires or two feeder lines. In the latter situation, the distance l is selected to be most suited for dividing the trolley wires into a plurality of closed loop areas which should be individually selected in consideration of the meteorological condition peculiar to that area.

Although the present invention has been described and illustrated in detail, it is clearly understood that the same is by way of illustration and example only and is not to be taken by way of limitation, the spirit and the scope of the present invention being limited only by the terms of the appended claims.

What is claimed is:

1. An apparatus for deicing of trolley wire in a power transmission system comprising:
   at least two trolley wires for supplying an alternating current power to an electric vehicle, each of which has a feeder line, said feeder line being connected to said trolley wires at a plurality of points to form a plurality of closed loops, and each feeder line in said closed loops passing through the through aperture of a through-type current transformer having a primary winding to which a voltage between said two trolley wires is applied in order to cause a Joule heat along said trolley wires.

2. An apparatus for deicing of trolley wires in accordance with claim 1, which further comprises switching means for selectively applying said alternating current voltage obtainable between said at least two trolley wires, to said primary winding of each of said transformer.

3. An apparatus for deicing of trolley wires in accordance with claim 2, which further comprises
   first temperature detecting means operatively coupled to at least one trolley wire for detecting the temperature of said one trolley wire,
   first decision means responsive to said first temperature detecting means for determining the temperature of said one trolley wire being lower than a predetermined temperature, and
   means responsive to said first decision means for controlling said switching means for applying said alternating current voltage obtainable between said at least two trolley wires to each of said transformers.

4. An apparatus for deicing of trolley wires in accordance with claim 2, which further comprises
   means provided between said two adjacent feeding points for detecting an ambient meteorological condition between said two adjacent feeding points,
   means responsive to said ambient meteorological condition detecting means for determining the output of said ambient meteorological condition detecting means reaching a predetermined ambient meteorological condition, and
   means responsive to said ambient meteorological condition determining means for applying said alternating current voltage obtainable between said at least two trolley wires to said primary winding of each said transformer.

5. An apparatus for deicing of trolley wires in accordance with claim 2, wherein said ambient meteorological condition detecting means comprises second temperature detecting means for detecting an ambient temperature between said two adjacent feeding points, and said ambient meteorological condition determining means comprises means responsive to said second temperature detecting means for level detecting the output of said second temperature detecting means.

6. An apparatus for deicing of trolley wires in accordance with claim 2, wherein said ambient meteorological condition detecting means comprises means for detecting water between said two adjacent feeding points, and said ambient meteorological condition determining means comprises means responsive to said water detecting means for determining the presence of water between said two adjacent feeding points.

7. An apparatus for deicing of trolley wires in accordance with claim 2, wherein said ambient meteorological condition detecting means comprises means for detecting snow between said two adjacent feeding points, and said ambient meteorological condition determining means comprises means responsive to said snow detecting means for determining the presence of snow between said two adjacent feeding points.

8. An apparatus for deicing of trolley wires in accordance with claim 2, which further comprises
   means operatively coupled to at least one feeder line between said two adjacent feeding points for detecting a current flowing therethrough,
   means responsive to said current detecting means for determining the detected current value being larger than a predetermined value, and
   means responsive to said current determining means for controlling said switching means for stopping a supply of said alternating current voltage obtainable between said at least two trolley wires, to said primary winding of each of said transformers.

9. An apparatus for deicing of trolley wires in accordance with claim 2, which further comprises means operatively coupled to at least one feeder line between said two adjacent feeding points for detecting a current flowing through said feeder line,
   means responsive to said current detecting means for determining the detected current being smaller than predetermined current value, and
   means responsive to said current determining means for controlling said switching means for applying said alternating current voltage obtainable between said at least two trolley wires to said primary winding of each said transformer.

10. An apparatus for deicing of trolley wires in accordance with any of the proceeding claims, wherein said power transmission system comprises three said trolley wires and three said feeder lines for supplying a three-phase alternating current power to an electric vehicle, and through-type current transformers are each provided for each feeder line such that each said feeder line extends through said through opening of said core of each said through-type current transformer.

* * * * *

UNITED STATES PATENT OFFICE
CERTIFICATE OF CORRECTION

Patent No. 4,190,137           Dated February 26, 1980

Inventor(s) Akira Shimada et al

It is certified that error appears in the above-identified patent and that said Letters Patent are hereby corrected as shown below:

Claim 2, line 6, replace "transformer" by --transformers--.

Claim 10, line 2, replace "any one of the proceeding claims" by --claim 1--.

*Signed and Sealed this*

*Seventeenth* Day of *June 1980*

[SEAL]

*Attest:*

SIDNEY A. DIAMOND

*Attesting Officer*     *Commissioner of Patents and Trademarks*